United States Patent [19]

Lepert et al.

[11] Patent Number: 5,236,624
[45] Date of Patent: Aug. 17, 1993

[54] DISPERSIONS AND EMULSIONS

[75] Inventors: Andre Lepert, Allouville Bellefosse; Jacques Mourand, Notre-Dame-de-Gravenchon; Alain J. M. Rauline, Pavilly, all of France; Thierry Lapie, Brussels, Belgium; Jean L. Marchal, Houppeville, France; Graham Yeadon, Overijse, Belgium

[73] Assignee: Exxon Chemical Patents Inc., Linden, N.J.

[21] Appl. No.: 547,534

[22] Filed: Jun. 29, 1990

Related U.S. Application Data

[62] Division of Ser. No. 167,657, Mar. 14, 1988, abandoned.

[30] Foreign Application Priority Data

Mar. 16, 1987 [GB] United Kingdom ............... 8706148

[51] Int. Cl.⁵ ........................... B01J 13/00; C08J 3/03
[52] U.S. Cl. .................................. 252/314; 252/311; 252/311.5; 252/312; 366/7; 366/14; 366/15; 366/336; 366/340; 524/832; 524/836
[58] Field of Search .................. 252/311, 311.5, 312, 252/314; 524/832, 836; 366/7, 14, 15, 336, 340

[56] References Cited

U.S. PATENT DOCUMENTS

| | | |
|---|---|---|
| 1,450,685 | 4/1923 | Kirschbraun ............... 252/311.5 |
| 1,869,697 | 8/1932 | Kirschbraun ............... 252/311.5 |
| 2,021,143 | 11/1935 | Calcott et al. .............. 252/314 |
| 2,326,610 | 8/1943 | Borglin ..................... 252/311.5 |
| 2,351,912 | 6/1944 | Borglin ..................... 252/311.5 |
| 2,844,541 | 7/1958 | Work ........................ 252/314 |
| 3,770,249 | 11/1973 | Schmitt .................... 366/336 X |
| 3,775,063 | 11/1973 | Grout et al. ............... 261/76 X |
| 3,862,078 | 1/1975 | Burke, Jr. .................. 524/583 X |
| 4,073,743 | 2/1978 | Midler, Jr. et al. ......... 252/314 X |
| 4,157,989 | 6/1979 | Clemons et al. ............ 252/314 X |
| 4,369,123 | 1/1983 | Selwitz et al. ............. 252/312 |
| 4,832,747 | 5/1989 | Marchal .................... 252/311.5 X |

Primary Examiner—Richard D. Lovering
Attorney, Agent, or Firm—John F. Hunt; T. Dean Simmons; Myron B. Kurtzman

[57] ABSTRACT

Dispersions of hydrophobic substance e.s. resin emulsions, usually having a relatively low average particle size can be continuously and speedily prepared by feed a hydrophobic substance in the liquid state into at least two static mixers, arranged in a series. The resin is introduced at a temperature above 50 degrees C but below its degradation temperature of hydrophobic substance and water under pressure is introduced into the first mixer. The mixture of resin and water is passed to another mixer maintained at a temperature lower than that prevailing in the first mixer and below the boiling point of water. Optionally aqueous solution of surfactant under pressure instead of water is introduced into the first mixer and optionally aqueous surfactant is introduced into the second mixer.

16 Claims, 1 Drawing Sheet

DISPERSIONS AND EMULSIONS

This is a division of application Ser. No. 07/167,657, filed Mar. 14, 1988, now abandoned.

This invention relates to a process for preparing dispersions and emulsions.

In the past resins have been emulsified by batch processes, for example as described in European Patent Application 0085471 A. In such processes (direct or inverse emulsion processes) the resin has been melted in the presence of water and mixed with an emulsifier under conditions of high shear. These batch processes have been found to be very slow. Also high energy and shear are required for blending, their flexibility is limited and it takes a long time (end of batch run) before knowing if the emulsion is satisfactory. These techniques have enabled resin emulsion of average particle size about 0.5 microns to be obtained. It has also been proposed that static mixers such as Kenics mixers may be used in the production of dispersions and emulsions as in the Kenics Corporation Design Bulletin effective Mar. 1, 1976.

We have now discovered a process for dispersing hydrophobic substances in water, e.g. the emulsification of petroleum resins, which is considerably faster to operate, which can be carried out continuously and which overcomes the above-mentioned disadvantages.

According to this invention a hydrophobic substance is dispersed in water by a process comprising:

(a) feeding the hydrophobic substance in the liquid state into one or more static mixers at a temperature above 50° C. but below the degradation temperature of the hydrophobic substance;

(b) introducing water under pressure into the static mixers, the pressure being sufficient to prevent substantial vapourisation of the water;

(c) mixing the water and liquid hydrophobic substance in the static mixers;

(d) passing the mixture of hydrophobic substance and water from the static mixers to a another cooling static mixer maintained at a temperature lower than that prevailing in the static mixers and below the boiling point of water;

(e) mixing the mixture of hydrophobic substance and water in the other static mixer; and (f) removing the dispersion of hydrophobic substance in water without substantial loss of water.

In this process it is believed that emulsification takes place in the first mixer or mixers and the final mixer is necessary to cool the emulsion to prevent water loss.

The term hydrophobic is used to describe natural and synthetic organic materials and their derivatives which will not spontaneously dissolve in water.

Patent literature relating to static mixers includes U.S. Pat. Nos. 3286992, 3664638, 3704006, 3917811, 3775063, 3800985, 3806097, 3860217, 3862022 and 3922220.

In the preferred embodiment of this process the hydrophobic substance is emulsified by the introduction of a surfactant into the process. Thus, aqueous solution of surfactant can be introduced into the first or second static mixer. Alternatively or as well, aqueous solution of surfactant under pressure can be introduced into the first static mixer. In another alternative or in addition, surfactant can be introduced into the first static mixer with the hydrophobic substance. In practice a surfactant is nearly always used, but water alone is usually sufficient when the hydrophobic substance is itself a salt such as neutralised rosin acids and neutralised functionalised waxes. Also, water alone may be used when the hydrophobic substance is an acid-containing modified rosin, rosin salt or acid anhydride modified resin.

By the process of this invention when using an aqueous surfactant solution and a hydrocarbon resin it is often possible to obtain resin emulsions having a disperse phase content of 50 to 60 weight % for emulsions of average diameter of less than 1 micron. In general resin emulsions which are mechanically stable and are of a low average resin particle size of about 0.1 to 1 preferably 0.1 to 0.35 micron are obtained by the process of this invention. It is usually possible to obtain a relatively high solids content of at least 50%.

This process is particularly useful when the hydrophobic substances are hydrocarbon resins (preferably organic hydrophobic substances) although substances other than resins (hydrocarbon, rosin, rosin derivatives and the like), can also be dispersed or emulsified. They include molten polymers such as waxes (natural, synthetic) EVA (ethylene vinyl acetate copolymers), modified EVA (hydrolysed, copolymerised with unsaturated acids such as acrylic/methacrylic acids) and rubbers. Oxidised waxes may also be used and these may, if desired, be neutralised during the emulsification.

Hydrogenated as well as chemically modified versions of all polymers described above including resins can also be emulsified by the process of this invention.

The process of this invention is especially useful for dispersing or emulsifying esters of rosin and hydrocarbon copolymers including petroleum resins, chemically modified hydrocarbon resins or their blends. It is desirable that the resin has a Ring and Ball (R&B) softening point greater than 10° C. e.g. between 10° and 180° C. and preferably 20° to 150° C. The process may also be used with liquid resins.

Examples of esters of rosin include the glycerol ester of rosin; the glycerol ester of hydrogenated rosin, e.g. 50 to 65% hydrogenated; the pentaerythritol ester of rosin; and the pentaerythritol ester of (50–65%) hydrogenated rosin. Other typical rosin esters are methanol, glycol esters or esters of polyols or ethoxylated polyols. Blends of hydrocarbon resins/rosin derivatives including fortified rosins salts of rosin acid modified resins or other polymers described above can be used.

Suitable polymers and copolymers of hydrocarbon monomers for use as the resin in the process of this invention include hydrocarbon resins prepared by polymerising monomer mixtures formed by cracking petroleum hydrocarbon mixtures; styrene; alpha-methylstyrene; vinyl toluenes; indene; butene-1 and 2;isobutylene; butadiene; isoprene; pentadienes; pentene-1 and 2; methyl butenes; branched olefins; cyclopentadiene; methyl cyclopentadiene, dimers and codimers; tetrahydroindene, vinyl norbornene, vinyl cyclohexene, norbornene, cyclics, alpha-methylstyrene-para-methylstyrene copolymers; vinyl-toluene copolymer resins; alpha-methylstyrene-styrene copolymers; low molecular weight styrene and modified styrene resins; and polyterpene resins derived from alpha-pinene, beta-pinene, and monocyclic terpenes such as dipentene. Other resins derived from the copolymerisation of the above described monomers as well as chloro or methoxystyrene can also be used.

Particularly preferred resins are hydrocarbon resins produced from steam cracked petroleum fractions. These hydrocarbon resins, i.e. petroleum resins, are the thermoplastic resins obtained by polymerisation, thermally or more frequently in the presence of a catalyst of the Friedel-Crafts type, of steam cracked petroleum distillates, boiling in the range between about 30° C. and 280° C., or any fraction of these distillates boiling within the said range, or of mixtures of olefins and diolefins containing sufficient diolefins to obtain either a solid resin or an oily polymer This polymerisation is performed at temperatures which range generally from 0° C. to 120° C., usually from 0° C. to 70° C., and preferably from 10° C. to 55° C.

These resins are polydienic in character and can have a ring and ball softening point between 10° C. and 180° C., preferably 20° C. to 150° C. and the process of the present invention may use any such resin.

These hydrocarbon resins are resins prepared by homo and copolymerisation of olefins, diolefins and aromatic components, predominantly $C_5$ and $C_9$ species, from distillates of cracked petroleum stocks. A Friedel-Crafts catalyst is typically employed. The resulting resin has an aliphatic, aromatic or mixed aliphatic-/aromatic character, generally with a minimum ring and ball softening point of 20° C.

Broadly, the hydrocarbon resins are polymerised from petroleum cracked distillates boiling in the range of about 30° C. to 280° C. or any fraction boiling within this range. The resins are prepared by thermal polymerisation or, more usually, by treating the distillates with 0.25-2.5% of a Friedel-Crafts type catalyst such as aluminium chloride, aluminium bromide, boron trifluoride, titanium tetrachloride and trichloride and the like or solutions, slurries, or complexes thereof. The reactions are conducted at temperatures in the range of 0° C. to 120° C., preferably 0° C. to 70° C., and more preferably 30° to 55° C. Residual catalyst is quenched by suitable methods such as addition of methyl alcohol and subsequent filtration, water and/or caustic or ammonia washing. The final solution is then stripped of unreacted hydrocarbons and low molecular weight oils by vacuum or steam distillation.

In place of the petroleum cracked distillates, the feed to polymerisation may consist of mixtures of a diolefin with an olefin. Sufficient diolefin must be present and incorporated in the polymer to give a resin having a suitably high melting point instead of an oil. However emulsions or oily oligomers can be produced by this process.

Typical hydrocarbon resins include $C_5$-$C_9$ resins prepared by polymerising the component mixture of a blend of $C_5$ stream and a $C_9$ stream from petroleum refining, commonly referred to as a $C_5$-$C_9$ stream. The primary components of a $C_5$-$C_9$ stream are unsaturated aliphatic and vinyl aromatic hydrocarbon compounds in which the number of carbons generally does not exceed ten. Other suitable hydrocarbon resins include $C_5$ hydrocarbon resins prepared by polymerising the monomer mixture of a $C_5/C_6$ stream from petroleum refining, the monomers being primarily unsaturated aliphatic. The primary monomers present in a $C_5$ stream are di- and mono-olefins, both normal and branched, having five carbons. Another suitable hydrocarbon resin is that prepared by polymerising a blend of terpene and a $C_5$, $C_5/C_6$ or a $C_5/C_9$ stream. A $C_4$ stream containing butenes and/or butadienes as well as cyclics such as dicyclopentadiene, vinyl cyclohexene, tetrahydroindene, norbornene, vinyl-norbornene, cyclopentene might be present.

Chemically modified resins such as maleic anhydride, unsaturated acids/anhydrides, epoxides, halogen, phenol modified products and salts might also be used. Hydrogenated resins (natural/terpenics/aromatics/synthetics) can also be easily emulsified by this process. This leads to lighter products and to improved oxidative and U.V. stability after drying.

Examples of thermal resins which may be emulsified by the process of this invention are the thermal polymers of cyclopentadiene and its derivatives and the hydrogenated versions thereof. In general suitable resins for the process of this invention have a melting point of between 10° C. and 150° C., preferably between 20° and 100° C. more preferably between 20° C. and 115° C.

Figure 1:
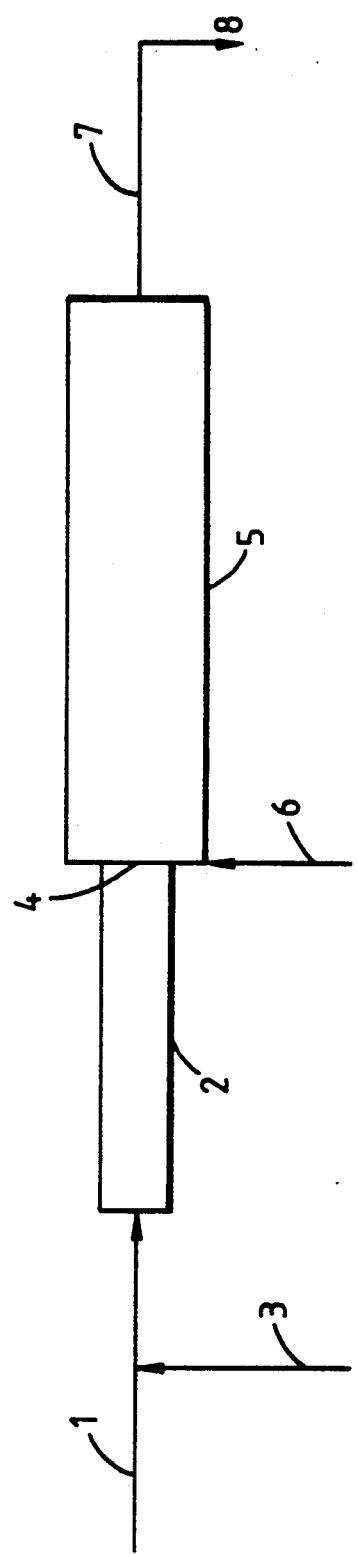
FIG. 1 shows apparatus useful in producing dispersions, said apparatus comprising two static mixers, the outlet of the first static mixer being coterminous with the inlet of the second static mixer, said apparatus being provided with a line for adding water quench at said inlet of the second static mixer.

Two or more static mixers may be used and they are generally not of the same size (length, diameter, number of internal elements). Static mixers are mixing devices which are fitted with fixed internal elements and mixing may be achieved by turbulent flow inside the device due to high stream velocity and high shear rate of the material passing through the device. These mixers usually comprise a cylindrical tube containing for example several fixed helical elements The feed materials fed into the inlet are pumped through the tube and are removed as an emulsion from the other end of the tube. Because of the specific design of the mixer there is successive division of the turbulent flow and this leads to dispersion of the materials as they pass through the mixer. A high flow rate is possible, the flow rate being a function of the static mixer diameter length and pump characteristics. Great flexibility is possible using static mixers where their length and the temperature and pressure can be adjusted to provide the desired emulsion. Particularly suitable static mixers are those known as Kenics and Sulzer. The number of mixers or of elements in the mixer is not limited and a combination of several types might be selected in order to adjust mixing efficiency and emulsion drop size dependent on the nature of the hydrophobic substance to be emulsified. We have found that with certain resins and waxes a longer first mixer or two mixers in series in which the initial contact between the liquid resin and the water occurs can be beneficial. The equipment is versatile and optimised emulsion drop size might be obtained by varying size (diameter, length) of static mixer as well as number of internal elements.

In accordance with the process of the invention the mixture of hydrophobic substance and water is passed from one static mixer to another static mixer. It is convenient therefore if the static mixers are located close to each other. It is therefore convenient for the mixers to be arranged concentrically and for the tubular diameter of the second static mixer to be slightly greater than that of the first static mixer and the outlet of the first static mixer extends into the second static mixer. In this manner the outlet of the first static mixer and the inlet of the second static mixer are coincident. Also possible is the division of flux in several static mixers installed in parallel for preparing dispersions or emulsions of resin blends and/or polymer/copolymer blends.

In accordance with the process of the invention the hydrophobic substance, e.g. resin, is fed into a static mixer in the liquid state at a temperature below its degradation temperature. Preferably the hydrophobic substance is in its molten state and so is at a temperature above its melting point. However the hydrophobic substance could be dissolved in a solvent, e.g. paraffin such as hexane, heptane or an aromatic hydrocarbon such as benzene or toluene. It is preferable to work at a high temperature so as to limit thermal shock or hardening effect. When using a petroleum resin this will in practice be between 50° C. and 300° C., for example 110° C. to 220° C., e.g. 140° C. to 160° C. Higher temperatures are preferred since the lower the viscosity of the molten hydrophobic substance the better the mixing with water so giving low and uniform particle size emulsions or dispersions. The temperature used must however not be so high as to prevent sufficient cooling in the second mixer or require such a large amount of quench water in the second mixer that the desired solids content of the emulsion or dispersion cannot be achieved.

Water is also introduced into the first static mixer and in a preferred embodiment, in the presence of a surfactant (emulsifier). When the emulsion is to be used as a tackifier in adhesive applications particularly for acrylic, natural or synthetic rubber lattices e.g. styrene/butadiene rubbers, we prefer that the emulsifier be an anionic, non-ionic or mixtures of such emulsifiers with a HLB (hydrophilic/lipophilic balance) greater than 12 for resins, rosins and their derivatives we prefer that the emulsifier have an HLB greater than 13. The introduction, e.g. injection of water into the first static mixer must be under pressure. This pressure must be sufficient to prevent substantial vapourisation of the water in the static mixer and in practice the pressure is usually between 2 and 100 bars, preferably between 2 and 70 bars more preferably between 2 and 50 bars. The differential pressure observed down the mixers is fully dependent upon their design (diameter, length, number of elements) and the flow rate inside the equipment. The feeding pump characteristics are the only limiting factors. The temperature in the first static mixer is usually between 110° C. and 160° C., for example about 150° C. but can in some circumstances be higher, e.g. up to 190° C.

The amount of water added is usually 10 to 80% by weight, preferably 25 to 50% by weight based on the weight of hydrophobic substance, e.g. resin.

The water, liquid hydrophobic substance, e.g. resin preferably including surfactant are thoroughly mixed in the first static mixer when dispersion and/or emulsification occurs and then passed to a second static mixer.

When using a resin and surfactant besides the obvious impact of the surfactant selection and the combination of resin melt viscosity and temperature, a high speed flow inside the mixer or mixers where emulsification takes place is effectual. For ensuring an efficient mixing between the hydrocarbon/water phase high speeds are required in the emulsifying mixer or mixers. Typical values vary from 5 to 50 meters/second such as 6 to 20 meters/second. Good emulsion stability and small emulsion droplet size are generally achieved when the speed exceeds 15 meters/second. Residence times as short as 1/1000 to 3/1000 second in a such static mixers are achieved.

After passage through the first static mixer the dispersed or emulsified mixture of hydrophobic substance and water passes to the second static mixer.

In the preferred embodiment of the present invention instead of water alone a rather dilute solution of surfactant is injected into the first static mixer in a proportion which preferably varies from 20 to 60 wt.% of the liquid hydrophobic substance, for example 50 wt.%. The surfactant concentration is usually from 0.1 to 25 wt.%, for example 1 to 10 wt.%, for instance about 4% based on the weight of water. This corresponds to a surfactant concentration of about 0.2 to 15 wt.%, preferably 3 to 7 more preferably 5 to 7 wt.%, based on the weight of hydrophobic substance. Those values are not limitative and could vary to a large extent depending on the nature of the hydrophobic substance to be emulsified. We have found that when emulsifying resins or rosins at least 1.5 parts by weight of surfactant per 100 parts of resin or rosin should be used if one is to obtain emulsions or dispersions of average particle size less than 0.5 microns.

As an alternative embodiment, the surfactant may be introduced with the hydrophobic substance into the first static mixer.

Any surfactant may be used, but usually the surfactant is anionic or non-ionic. However since the HLB (hydrophilic/lipophilic balance) is an important element in the surfactant performance other surfactants or their blends might be also used (e.g. cationic, amphoteric). Where the resin emulsion is to be used for tackification of acrylic polymers in water based adhesive formations it is preferred that the surfactant be anionic, non-ionic or a mixture thereof and preferably has an HLB of greater than 12.

Suitable anionic surface-active agents include water soluble alkali soaps (e.g. sodium, potassium or ammonium) of rosin or of modified rosin, soaps of oleic acid, alkaryl sulphonates e.g. sodium alkyl benzene sulphonates, fatty alcohol sulphates, e.g. sodium lauryl sulphate; phosphate esters, e.g. the sodium salts of mono- and di-esters of orthophosphoric acid; esters of sulphosuccinic acid; the sodium salts of sulphated monoglycerides; and sulphonates or sulpho succinates of alkyl polyoxyalkylene oxide condensates or of alkyl phenol polyalkylene oxide condensates, e.g. the ammonium salt of nonylphenol polyethylene oxide sulphonic acid. Other anionic surface-active agents are amine soaps. These soaps are formed by the reaction of an amine with a fatty acid such as oleic acid, palmitic acid, lauric acid, myristic acid, the tall oil acids, modified tall oil acids (modified rosin), or the palm oil acids in about stoichiometric amounts and at room temperature or at a slightly elevated temperature. Particularly preferred is morpholine oleate. Other suitable amine soaps are triethanolamine stearate, triethanolamine oleate, triethanolamine coconut oil soap, isopropanolamine oleate, N,N-dimethylethanolamine oleate and 3-methoxypropylamine oleate.

Suitable non-ionic surface-active agents are organic compounds of a relatively high molecular weight and consisting of a hydrophobic portion to which is attached a solubilising or hydrophilic portion containing groups such as ether links (—C—O—C—), hydroxyl group (—OH) and carboxy groups

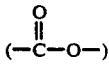

Specific examples are surfactants having as the hydrophilic moiety one or more chains containing one or more alkyleneoxy groups. These surfactants have the general formula:

wherein R is the hydrophobic portion of an aliphatic alcohol containing from 8 to 22 carbon atoms or an alkylated phenol containing from 4 to 22 carbon atoms in the alkyl group thereof including mono- and di-alkyl phenols, W is an alkyleneoxy chain, H is a hydrogen atom bonded to an oxygen atom of the alkyleneoxy chain, and y is an integer from 1 to 50, and preferably from 4 to 30.

Typical aliphatic alcohols are octyl alcohol, nonyl alcohol, decyl alcohol, "coco" alcohol (a mixture of $C_{10}$ to $C_{16}$ alcohols), dodecyl alcohol, oleyl alcohol, tallow alcohol (a mixture of $C_{16}$ to $C_{18}$ alcohols), octadecyl alcohol and 2,6,8- trimethyl-4-nonyl alcohol.

Typical alkylated phenols are butylphenol, pentylphenol, hexylphenol, octylphenol, nonylphenol, dodecylphenol, hexadecylphenol, octadecylphenol and nonadecylphenol.

In general suitable non-ionic surface-active agents include polyethylene oxides, e.g. fatty alcohols or alkyl phenols reacted with ethylene oxide, such as oleyl alcohol reacted with 15 moles of ethylene oxide; polyalkylene oxide block copolymers in which the alkylene oxide blocks are for example those of ethylene oxide and propylene oxide; carboxylic amides i.e. the condensation products of fatty acids and hydroxyalkyl amines, e.g. diethanolamine condensates and polyoxyethylene fatty acid amides, and carboxylic acid esters, e.g. glycerol esters, polyoxyethylene esters and ethoxylated and glycol esters of fatty acids.

Preferred non-ionic surface-active agents are the polyalkylene glycol ethers containing from 4 to 80 moles of alkylene oxide. Illustrative preferred non-ionic surfactants are the nonylphenol polyethylene glycol ethers containing about 4 moles of ethylene oxide, the trimethylnonyl polyethylene glycol ethers containing about 6 moles ethylene oxide, the nonylphenyl polyethylene glycol ethers containing about 7 moles of ethylene oxide and mixed polyalkylene glycol ethers containing about 60 moles of a mixture of ethylene oxide and 1,2-propylene oxide in a mole ratio of about 2:1.

Although cationic surface-active agents are not preferred they may be used to produce emulsions for certain applications such as glass fibre size and typical materials are the combination of an organic acid, such as acetic acid, with an amine such as cyclic imidazoline, tertiary ethoxylated soya amine, tallow polyethoxylated amine having two ethoxy units in the polyethoxylated portion of the molecule, the oleyl polyethoxylated amines having two to five ethoxy units in the polyethoxy portion of the molecule and soya polyethoxylated amine having five ethoxy units in the polyethoxy portion of the molecule.

In another preferred embodiment of the invention water is introduced into the cooling static mixer; this water acts as a quench to bring the temperature of the emulsion or dispersion to below the boiling point of water before it is ejected from the mixers and also ensures the desired solids content of the final emulsion or dispersion. For avoiding a significant loss of water and for monitoring the emulsion stability this temperature is adjusted for maintaining the second static mixer at a temperature below the boiling point of water. This temperature is usually between 40° C. and 100° C. e.g between 70° C. and 100° C. and preferably below 90° C. This quenching is also needed for controlling the content of hydrophobic substance of the finished emulsion recovered at the end of the second static mixer and sent to storage or for putting into drums.

Even more preferably instead of water, an aqueous solution of surfactant is introduced into the cooling static mixer The surfactant may be one of the ones mentioned above in connection with the aqueous solution of surfactant which can be introduced into the first static mixer. It is emphasized that the water added at the inlet of the cooling static mixer is intended to control the hydrophobic substance content of the emulsion and to act as a coolant.

As another embodiment of the invention further materials can be introduced into one of the static mixers. Thus one can introduce one or more materials into the inlet of one of the cooling static mixers so as to make an emulsion of a resin containing polymer latex particularly those used as adhesives such as pressure sensitive adhesives. Where a polymer latex is used, we prefer to introduce it into the cooling mixer where it will contribute to the cooling effect. In this case the aqueous dispersion of resin can be then blended with a latex to form a resinous latex adhesive.

Suitable latexes include those containing natural rubber and synthetic rubber or elastomers. Typical synthetic rubbers include styrene-butadiene rubber (SBR), carboxylated styrene-butadiene rubber, polyisoprene, acrylonitrile-butadiene rubber (NBR), polychloroprene (neoprene), polyurethane rubbers (isocyanate), acrylonitrile-butadiene-styrene rubbers (ABS), styrene-butadiene-styrene block copolymers (SBS - Cariflex 1102), styrene-isoprene-styrene block copolymers (SIS - Cariflex 1107) as well as their hydrogenated version (Kraton G), and acrylic resins.

Alternatively the latex can be derived from the various vinyl latexes such as ethylene-vinyl acetates and ethylene/vinylacetate/acrylate copolymers.

As an alternative to a natural or synthetic rubber an acrylic resin can be used. These acrylic resins are usually formed by the polymerisation of the monomeric derivatives, generally esters or amides of acrylic acid or methacrylic acid.

The ratio of latex, e.g. rubber or acrylic resin, to resin, e.g. petroleum resin, in the final emulsion can vary but it usually lies between 1:10 and 10:1 by weight, for example 70:30 by weight for an acrylic resin and 50:50 for a carboxylated SBR (CSBR).

As a result of the process of the invention one is able to obtain emulsions with a relatively low average particle size, for example between 0.1 and 1 micron preferably below 0.5 microns. It has been observed that using the process of this invention the dispersion can be increased i.e. producing a higher fineness by (a) decreasing the viscosity of the components of the emulsion by increasing the temperature thereof and/or (b) increasing the flow speed in the static mixers. The solids content of the emulsions attainable depends upon the nature of the hydrophobic substance but with resins and rosins we find emulsions containing up to 60 wt per cent solids may be obtained of very uniform particle size whilst with waxes emulsions containing up to 30 wt per cent solids may be obtained, above 30 wt per cent the products can be gels which will no longer flow.

Compared with previous processes one can often obtain a higher total flow rate at a significantly reduced cost. The process of this invention is a cheap continuous process since it allows a high production rate (1.5 tons/hour or 30 tons/day in pilot facilities) as well as a great flexibility in process equipment selection (several mixers in series, variable size and number of internals, various injection points, surfactant blends, temperature gradient). Moreover, establishing the optimum emulsion operating conditions is extremely easy, the steady state in the equipment being reached after a few seconds. It allows recycling operations (finished emulsion recycled at the inlet of the first static mixer) for improving the particle size distribution and emulsion stability. This process also permits direct blending with other emulsions such as natural and synthetic latexes (SBR), carboxylated SBR and acrylics. Typical applications of the process of this invention are any area where emulsions are applied and known by the art such as paper coating, textiles finishes, metal working, paints and latexes, asphalt paving, cosmetics, fruit treatment, insecticide formulations, leather-treating emulsions, drilling fluid, concrete, dispersant formulations, dyes and pigments, flotation, plastics, industrial oils, chemical intermediates and agriculture.

The invention is illustrated by the following Examples:

EXAMPLE 1

A diagrammatic illustration of a process using two static mixers is shown in FIG. 1. The resin is fed through line 1 into the a static mixer 2. Surfactant solution is fed through line 3 and line 1 and into a first static mixer 2. The outlet of the first static mixer is coterminous with the inlet 4 of a second static mixer 5. A water quench is added to the inlet 4 via line 6. The desired emulsion is removed from the outlet of the second static mixer via line 7 and passed to storage at 8. Both of the static mixers were Kenics mixers the first one of length 7 cm (8 elements) and diameter ¼" (0.63 cm) and the second one of length 25 cm (6 elements) and diameter ½" (1.27 cm).

Three tests were carried out and the particle sizes of the emulsion measured. In each case a petroleum resin was fed into the first mixer 2 maintained at about 155° C. The temperature of the surfactant solution introduced into the mixer 2 via lines 3 and 1 varied in the tests. The temperature of the water quench introduced through line 6 was 15° C. The temperature of the resin mixture in the second static mixer 5 was about 90° C. and the temperature of the emulsion removed through line 7 was about 90° C.

In each test the resin used was a low softening point (50° C.) aliphatic/aromatic hydrocarbon resin containing 20 wt.% styrene and the surfactant used was Atlox 3404FB having an HLB of 10 and/or sodium oleate with an HLB of 17.7 and sodium and potassium rosinate (HLB 17-10). For comparison two reference tests were carried out in which only one static mixer was used. This was ¼" (0.63 cm) diameter and of length 7 cm. The resin was fed in with Atlox 3404FB (HLB 10) and/or sodium and/or potassium oleate and the emulsion removed at about 90° C. from the outlet of the static mixer.

Atlox 3404FB is a surfactant manufactured by ICI (anionic/non-ionic blend containing 2/3 of calcium alkyl aryl sulphonate).

The results obtained in the seven tests are shown in Tables 1 and 2, which show that emulsions can be produced although not with ideal properties for stability, particle size etc.

Centrifugation tests were carried out in a Heraeus Verifuge Model 4120 centrifuge to evaluate phase stability, values below 1 volume per cent showing satisfactory emulsions, below 0.5 volume per cent being preferred.

Some of these emulsions were used for producing water based adhesives after blending with either carboxylated SBR (CSBR such as PL3703 manufactured by POLYSAR) or acrylics emulsions (Acronal 85D manufactured by BASF).

The adhesive test results are shown in Table 2 and the tests are those currently used in the adhesive industry (PSTC stands for Pressure Sensitive Adhesive Tapes Council methods).

TABLE 1

| | EMULSION TRIALS | | | | | | | | |
|---|---|---|---|---|---|---|---|---|---|
| Experiment No. | 1 | 2 | 3 | 4 | 5 | 6 | 7 | 8 | 9 |
| Static mixer (SM) number SM1 | 1 | 1 | 2 | 2 | 2 | 2 | 2 | 2 | 2 |
| Number of elements | 8 | 8 | 6 | 8 | 8 | 8 | 8 | 8 | 8 |
| Resin: | | | | | | | | | |
| Temperature (°C.) | 138 | 138 | 135 | 150 | 150 | 150 | 155 | 155 | 155 |
| Emulsifier (wt % on resin) | none | ATLOX 0.8 | ATLOX 2.0 | ATLOX 0.8 | ATLOX 0.8 | — | ATLOX 1.0 | — | — |
| Flow rate (liter/hr) | 500 | 580 | 720 | 760 | 760 | 760 | 760 | 760 | 760 |
| Speed (m/s) | 7 | 8.5 | 10.5 | 10.8 | 10.8 | 10.8 | 10.8 | 10.8 | 10.8 |
| Pressure (bars) | 30 | 30 | 28 | 35 | 35 | 35 | 35 | 35 | 35 |
| Water/Surfactant: | | | | | | | | | |
| Temperature (°C.) | 48 | 48 | 85 | 85 | 85 | 85 | 85 | 85 | 85 |
| Emulsifier (wt % on total emulsion) | ATLOX 5.5 | Na oleate 1.8 | Na oleate 1.0 | Na oleate 1.8 | Na oleate 1.8 | Na oleate 2.6 | Na oleate 2.6 | Na rosin 2.6 | K rosin 2.6 |
| Flow rate (liter/hr) | 470 | 530 | 380 | 620 | 350 | 320 | 320 | 320 | 320 |
| Quench (liter/hr) | none | none | 270 | none | 270 | 320 | 320 | 320 | 320 |
| Temperature (°C.) | | | 15 | | 15 | 18 | 18 | 18 | 18 |
| Pressure (bars) | | | 3 | | 3 | 3 | 3 | 3 | 3 |
| SM2 | | | | | | | | | |
| Emulsion: | | | | | | | | | |
| Temperature (°C.) | | | 89 | 94 | 94 | 90 | 90 | 87 | 88 |
| Flow rate (liter/hr) | | | 1370 | 1380 | 1380 | 1400 | 1400 | 1400 | 1400 |

TABLE 1-continued

EMULSION TRIALS

| Experiment No. | 1 | 2 | 3 | 4 | 5 | 6 | 7 | 8 | 9 |
|---|---|---|---|---|---|---|---|---|---|
| Speed (m/s) |  |  | 20 | 20 | 20 | 22 | 22 | 22 | 22 |
| Analytical Characteristics: |  |  |  |  |  |  |  |  |  |
| Average particle size (mµ)* | 6.9 | 1.0 | 0.9 | 0.66 | 0.56 | 0.46 | 0.46 | 0.75 | 0.63 |
| Solid content (wt %) | 56 | 53 | 52.5 | 55 | 55 | 52 | 52 | 52 | 52 |
| Centrifugation** (vol % settled) | broken | 4 | 4 | 4 | 4 | 0.4 | 0.4 | 4 | 1.6 |

*Measured by Coulter equipment.
**Centrifugation 3000 t/min 20 minutes.

TABLE 2

ADHESIVE PROPERTIES OF EMULSIONS

Acrylic Formulation

100 parts BASF Acronal 85
35 parts resin on dry basis coated on Mylar
Thickness 23µ
Adhesive weight 25 g/m$^3$
Drying 10 min at 120°C.

| Experiment No. |  | 3 | 6 | 7 | 8 | 9 |
|---|---|---|---|---|---|---|
| 180° Peel Strength (g/cm) | PSTC-1 | 280 | 400 | 395 | 300 | 330 |
| Loop Tack on Metal (N/25 mm) |  | 7 | 7.5 | 8 | 6 | 7.5 |
| Loop Tack on Glass (N/25 mm) |  | 9 | 9 | 7 | 6.5 | 10.5 |
| Loop Tack on Polyethylene (N/25 mm) |  | 4 | 7.5 | 7 | 5 | 6 |
| Ball Tack (cm) | PSTC-6 | 6 | 8 | 7 | 6.5 | 8 |
| Shear PS | PSTC-7 | 1.5 | >150 | 122 | 118 | >150 |

Carboxylated SBR Formulation

100 parts Polysar CSBR PL 3703
100 parts resin coated on Mylar
Thickness 23µ
Adhesive weight 25 /gm$^3$
Drying 10 min at 120° C.

| Experiment No. |  | 3 | 4 | 5 |
|---|---|---|---|---|
| 180° Peel Strength (g/cm) | PSTC-1 | 575 | 570 | 570 |
| Loop Tack on Metal (N/25 mm) |  | 12 | 11 | 11 |
| Ball Tack (cm) | PSTC-6 | 2 | 2 | 2 |

EXAMPLE 2

In this Example the mixed aliphatic/aromatic low softening point resin has been replaced by respectively a blend of a higher softening point aliphatic resin (Escorez 1310 manufactured by Exxon) and an aromatic oil or by a blend of rosin esters Tergum 45 and Tergum ND 190 (38/62 wt.% ratio) manufactured by Resisa in Spain. After melting the rosin ester blend had an average softening point of 55° C. These ester rosins had the following characteristics:

| Form |  |  |
|---|---|---|
| Tergum 45 | liquid | Triethylene glycol ester of stabilised rosin |
| Tergum ND 190 | solid Melting point 83° C. | Dehydrogenated glycerol ester of rosin |

As in Example 1 the emulsion was based on a two static mixer (SM1+SM2) process. No surfactant was added to the resin and the process conditions were those of experiments 6 to 9. Surfactant was added to water and introduced in SM1 at about 320 liters/hour and 85°. Total emulsion production rate was 1400 liters/hour to 1500 liters/hour. Results are shown in Table 3.

TABLE 3

EMULSION TRIALS

| Experiment No. | 10 | 11 | 12 | 13 | 14 |
|---|---|---|---|---|---|
| Resin nature | as in Table 1 | Escorez 1310 (100 parts) Oil (20 parts) | Excorez 1310 (100 parts) (20 parts) | ← Tergum 45 38 parts → ← Tergum ND190 62 parts → |  |
| Emulsifier type | K oleate | K rosinate | K oleate | K oleate | Na oleate |
| Wt % on total emulsion | 2.6 | 2.6 | 2.6 | 2.6 | 2.6 |
| Emulsion Characteristics: |  |  |  |  |  |
| Average particle size* (mµ) |  |  |  | 0.26 | 0.20 |
| Solid content (wt %) | 52 | 52 | 52 | 52 | 52 |
| Centrifugation test (vol %) | 0.2 | 4 | 0.7 | No separation | No separation |

*By Coulter N$_4$ measurement.

TABLE 4

ADHESIVE PROPERTIES OF EMULSIONS

Acrylic Formulation

TABLE 4-continued
ADHESIVE PROPERTIES OF EMULSIONS

BASF Acronal V205 (70 parts)
Resin (30 parts on dry basis) coated on Mylar Polyester film
Thickness 23μ
Adhesive weight 22 g/m²
Drying 10 min at 120° C.

| Experiment No. | | 13 | 6 and 14 | 10 and 13 |
|---|---|---|---|---|
| 180° Peel Strength (g/cm) | PSTC-1 | 300 | 380 | 360 |
| Loop Tack on Metal (N/25 mm) | | 7.0 | 9.0 | 9.0 |
| Loop Tack on Glass (N/25 mm) | | 7.0 | 12.0 | 10.0 |
| Loop Tack on Polyethylene (N/25 mm) | | 5.0 | 8.0 | 9.5 |
| Ball Tack (cm) | PSTC-6 | 20 | 10 | 5 |
| Shear Final Test (hr) | PSTC-7 | 12 | 24 | 16 |

EXAMPLE 3

Various further trials were carried out using a 90:10 resin:oil blend of the components used in Example 2 and apparatus described in Example 1 (2 mixers) and also with an apparatus with three mixers in series the first being ½" inch (1.27 cm) diameter containing 6 elements, the second being ¼ inch (0.63 cm) diameter containing 6 elements and the third being ½ inch (1.27 cm) diameter containing 10 elements. The first two mixers being for emulsification and the third for cooling. Potassium Rosinate (KOH Ros), potassium oleate (KOH Ole), Sodium Rosinate (NaOH Ros) and rosinate esters were used as surfactant, the products being two thirds neutralised.

Test 1

| SM Type | Surfactant | wt % on Resin | TEMPERATURE | | | DISPERSION PROPERTIES | | | |
|---|---|---|---|---|---|---|---|---|---|
| | | | Resin | Water | Emulsifying SM | % Solid | Visc* (3/50) | pH | Particle Size (nm) |
| 2 | KOH Ros | 6.0 | 175 | 70 | 126 | 56.3 | 560 | 10.3 | 720 |
| 2 | KOH Ros/Ole | 2.0/4.0 | 175 | 71 | 129 | 56.4 | 440 | 10.1 | 684 |
| 2 | KOH Ole | 1.0 | 175 | 70 | 134 | 56.2 | 454 | 10.6 | 500 |
| 3 | NaOH Ros | 5.0 | 177 | 90 | 145 | 51.5 | 342 | 11.1 | 393 |
| 3 | NaOH Ros | 5.0 | 177 | 90 | 150 | 51.9 | 214 | 10.2 | 414 |
| 3 | NaOH Ros | 7.0 | 177 | 90 | 145 | 52.0 | 710 | 11.3 | 293 |
| 3 | NaOH Ros | 17.0 | 177 | 90 | 150 | 53.1 | 464 | 10.1 | 291 |
| 3 | Rosinate in aqueous phase | 4.5 | 180 | 79 | — | 54.3 | 186 | 12.6 | 311 |
| 3 | NaOH Ros | 7.0 | 180 | 86 | — | 50.2 | 42 | 13.1 | 252 |

*Brookfield (3/50 mPas)

EXAMPLE 4

Similar tests to Example 2 were carried out using the resins used in Example 1.

The surfactants were as used in Example 3 except fully neutralised used.

The results were as follows:

Test 2

| SM Type | Surfactant | wt % on Resin | TEMPERATURE | | | EMULSION PROPERTIES | | | |
|---|---|---|---|---|---|---|---|---|---|
| | | | Resin | Water | Emulsifying SM | % Solid | Visc* (3/50) | pH | Particle Size (nm) |
| 2 | KOH Ros | 5.0 | 174 | 85 | 144 | 55.7 | 350 | 10.4 | 472 |
| 2 | KOH Ros | 7.0 | 175 | 85 | 147 | 55.5 | 318 | 10.3 | 379 |
| 2 | NaOH Ros | 7.0 | 177 | 82 | 150 | 55.4 | 528 | 10.4 | 301 |
| 3 | Fully neutralised | 7.0 | — | — | — | 48.7 | 54 | 13.6 | |
| 3 | Fully neutralised | 7.0 | 180 | 90 | — | 51.4 | 90 | 13.3 | 233 |
| 3 | Fully Neutralised | 7.0 | — | — | — | 49.9 | 70 | 13.3 | 243 |

*Brookfield (3/50) mPas

EXAMPLE 5

Similar tests to Example 2 were carried out using the commercially available rosin derivatives Brai Alpha from DRT and the emulsifiers Aerosol A 103 and 22 commercially available from Cyanamid.

The results were as follows:

TEST 3

| Run No | SM Type | Surfactant | wt % on Rosin | TEMPERATURE | | | EMULSION PROPERTIES | | | |
|---|---|---|---|---|---|---|---|---|---|---|
| | | | | Rosin | Water | 1st SM | % Solid | Visc* (3/50) | pH | Particle Size (nm) |
| 1 | 2 | A103 | 2.4 | 175 | 81 | 141 | 48.5 | 340 | 4.5 | 170 |
| 2 | 3 | A103 | 2.4 | 175 | 85 | 145 | 47.7 | 336 | 4.3 | 172 |
| 3 | 3 | 22 | 2.4 | 177 | 82 | 143 | 49.6 | 110 | 5.0 | 178 |
| 4 | 3 | 22/A103 | 3.5 | 177 | 90 | 145 | 50.7 | 172 | 4.8 | 167 |
| 5 | 3 | A103 | 4.8 | 175 | 83 | 143 | 48.3 | 268 | 4.4 | 200 |

*Brookfield (3/50) mPa.s

The rosin emulsions obtained were tested as tackifiers for the acrylic polymer emulsions commercially available as Acronal 85 D in 30 Rosin:70 Acronal blends.

The results were as follows:

TEST 4

| Run No | Surfactant | wt % on Resin | peel inox | loop inox | loop PE | shear inox |
|---|---|---|---|---|---|---|
| 1 | A103 | 2.4 | 11 | 7.8 | 4.6 | 42 |

TEST 4-continued

| Run No | Surfactant | wt % on Resin | peel inox | loop inox | loop PE | shear inox |
|---|---|---|---|---|---|---|
| 2 | A103 | 2.4 | 10.8 | 7.8 | 4.4 | 36 |
| 3 | 22 | 2.4 | 9.6 | 8 | 4.2 | 30 |
| 4 | 22/A103 | 3.5 | 9.6 | 8 | 4.2 | 30 |
| 5 | A103 | 4.8 | 11.4 | 8.8 | 4.8 | 42 |

All samples are 30/70 Rosin:Acronal 85 D coated onto Mylar at 22 gram per sq meter
180 deg peel values are N/25 mm after 30 min dwell PSTC
Loop values are N/25 mm PSTC
Shear values are 1.5 mm × 25 mm × 2 kg in min PSTC

EXAMPLE 6

The three-mixer technology of Example 3 was used to emulsify the synthetic polyethylene wax commercially available from Exxon as Escomer H-101.

Escomer H-101 has the following properties:

| PROPERTY | TEST METHOD | VALUE |
|---|---|---|
| Brookfield Viscosity mPas @ 121° C. | ASTM D - 3236 | 27 |
| Ring & Ball Softening Point °C. | ASTM E - 28 | 112 |
| Vicat Softening Point °C. | ASTM D - 1525 | 68 |
| Penetration, dmm (100 g, 5 sec, 25° C.) | ASTM D - 1321 | 3 |
| Drop Melt Point °C. | ASTM D - 127 | 110 |
| Dongeal Point °C. | ASTM D - 938 | 101 |
| Peak Melt Point (DSC) °C. | ASTM D - 3417 | 111 |
| Density g/cm$^3$ | ASTM D - 1505 | 0.95 |

All tests used 3 static mixers and the results were as follows:

TEST 5

| Wax | Surfactant | wt % on Resin | TEMPERATURE | | | EMULSION PROPERTIES | | | |
|---|---|---|---|---|---|---|---|---|---|
| | | | Resin | Water | Emulsifier Mixer | % Solid | Visc* (3/50) | pH | Particle Size (nm) |
| Escomer H101 | Na Oleate | — | 180 | 91 | 131 | 21.7 | liquid | 13.3 | 345 |
| Escomer H101 | Na Oleate | — | 180 | 90 | 129 | 24.0 | liquid | 13.3 | 374 |
| Escomer H101 | Na Oleate | — | 180 | 90 | 127.5 | 20.8 | liquid | 13.4 | 30 |
| Escomer H101 | Na Oleate | — | 180 | 92 | 134 | 31.9 | liquid | 13.4 | 283 |

Notes -
viscosities are Brookfield (3/40) mPas

We claim:

1. A process for producing a dispersion of a hydrophobic composition in an aqueous solution, comprising the steps of:
   (a) mixing the hydrophobic composition with the aqueous solution in a first mixing apparatus, to form a mixture, at a temperature above about 50° C.;
   (b) pressurizing the mixture to prevent vaporization of the water;
   (c) transferring said mixture to a second mixing apparatus; and
   (d) cooling the mixture in said second mixing apparatus to a temperature below the temperature of step (a) and below the boiling point of the aqueous solution at the pressure present in said second mixing apparatus.

2. The process of claim 1 wherein the hydrophobic composition is an organic resin with a ring and ball softening point of from about 10° to about 180° C.

3. The process of claim 1 wherein the mixing of step (a) is carried out at a temperature from about 50° to about 300° C.

4. The process of claim 1 wherein the hydrophobic composition comprises organic resins, waxes, oxidized waxes, rosins, rosin esters or salts, natural rubbers, synthetic rubbers or mixtures thereof.

5. The process of claim 1 wherein said mixing apparatus is a static mixer.

6. The process of claim 5 wherein the speed of the mixture through the static mixer is above about 15 meters/second.

7. The process of claim 1 further comprising the step of adding a surfactant.

8. The process of claim 7 wherein the surfactant comprises a cationic surfactant, anionic surfactant, or a mixture thereof, the surfactant having an HLB greater than 12.

9. The process of claim 7 wherein said mixing, pressurizing, adding and cooling produces a dispersion wherein from about 40 to about 60 percent of the emulsion particles are less than 0.50 microns in size.

10. A process for producing a dispersion of an organic hydrophobic composition, selected from the group consisting of organic resins, waxes, oxidized waxes, rosins, rosin esters or salts, rubbers, EVA, modified EVA and mixtures thereof, comprising the steps of:
    (a) mixing the hydrophobic composition with an aqueous solution in a first mixing apparatus to form a mixture, at a temperature above about 50° C.;
    (b) maintaining said first mixing apparatus at a sufficiently high pressure to prevent vaporization of the aqueous solution;
    (c) transferring said mixture to a second mixing apparatus; and
    (d) cooling the mixture in said second mixing apparatus to a temperature below the temperature of step (a) and below the boiling point of water at the pressure present in said second mixing apparatus.

11. The process of claim 10 wherein from about 40 to about 60 percent of the dispersion particle size is less than 0.5 microns.

12. The process of claim 11 further comprising adding a surfactant selected from the cationic surfactants, anionic surfactants and mixtures thereof having an HLB greater than about 12.

13. The process of claim 12 wherein the hydrophobic composition is in a molten or dissolved state before the mixing of step (a).

14. The process of claim 12 wherein the amount of 14 in aqueous solution in said step of mixing is from about 10 to about 80 wt.%, based on the weight of the hydrophobic composition.

15. The process of claim 10 wherein said mixing includes mixing with a polymer latex.

16. The process of claim 10 further comprising adding a polymer latex after said step of mixing with an aqueous solution.

* * * * *